(12) United States Patent
Kumagai et al.

(10) Patent No.: US 8,736,696 B2
(45) Date of Patent: May 27, 2014

(54) IMAGE PROCESSING APPARATUS, IMAGING APPARATUS AND IMAGE PROCESSING METHOD

(75) Inventors: Akira Kumagai, Yokohama (JP); Nobuyasu Akaizawa, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 282 days.

(21) Appl. No.: 13/094,542

(22) Filed: Apr. 26, 2011

(65) Prior Publication Data

US 2012/0038794 A1 Feb. 16, 2012

(30) Foreign Application Priority Data

Aug. 16, 2010 (JP) ................................ 2010-181793

(51) Int. Cl.
*H04N 5/225* (2006.01)
*H04N 9/68* (2006.01)
*H04N 13/02* (2006.01)

(52) U.S. Cl.
USPC ........................... 348/218.1; 348/234; 348/50

(58) Field of Classification Search
USPC ............ 348/234–238, 96–103, 38, 70, 218.1, 348/50
See application file for complete search history.

(56) References Cited

U.S. PATENT DOCUMENTS

| 6,819,713 | B1 | 11/2004 | Sato |
| 7,724,205 | B2 * | 5/2010 | Inazumi ........................ 345/1.3 |
| 8,164,641 | B2 * | 4/2012 | Kawakatsu et al. ......... 348/218.1 |
| 8,411,541 | B2 * | 4/2013 | Park et al. .................. 369/53.22 |
| 2002/0027608 | A1 * | 3/2002 | Johnson et al. ............... 348/383 |
| 2002/0030748 | A1 * | 3/2002 | Kitaguchi et al. ............. 348/218 |
| 2002/0054217 | A1 * | 5/2002 | Matsuda et al. .............. 348/218 |
| 2003/0194143 | A1 * | 10/2003 | Iida ............................... 382/241 |
| 2004/0227908 | A1 * | 11/2004 | Wada et al. ...................... 353/94 |
| 2008/0266408 | A1 * | 10/2008 | Kim .......................... 348/218.1 |

FOREIGN PATENT DOCUMENTS

| JP | 2000-134631 A | 5/2000 |
| JP | 2004-289746 A | 10/2004 |

* cited by examiner

*Primary Examiner* — Tuan Ho
*Assistant Examiner* — Shahbaz Nazrul
(74) *Attorney, Agent, or Firm* — Arent Fox LLP

(57) ABSTRACT

An image processing apparatus includes: a computing unit which determines a first difference value between brightness of a first image data and brightness of a second image data in an overlap area of the first image data including a first brightness characteristic with the second image data having a peripheral area at the center of the first image data and including a second brightness characteristic; and a generating unit which generates a brightness correction parameter for the first image data corresponding to the first difference value.

17 Claims, 17 Drawing Sheets

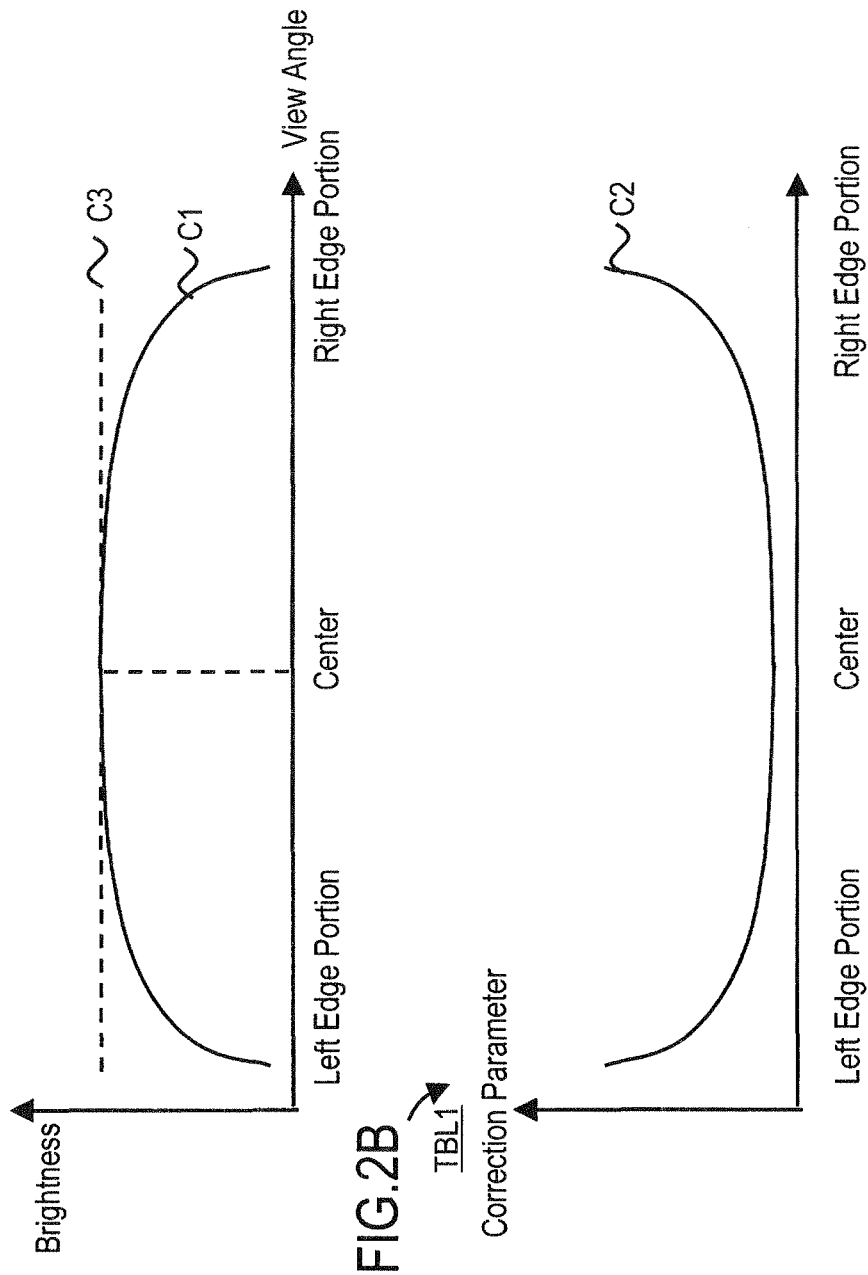

FIG.10A

| 100 | 100 | 100 | 100 | 100 |
|---|---|---|---|---|
| 100 | 100 | 100 | 100 | 100 |
| 100 | 100 | 100 | 100 | 100 |
| 100 | 100 | 100 | 100 | 100 |
| 100 | 100 | 100 | 100 | 100 |

| 96 | 95 | 92 | 88 | 82 |
|---|---|---|---|---|
| 99 | 98 | 95 | 90 | 84 |
| 100 | 99 | 96 | 91 | 85 |
| 99 | 98 | 95 | 90 | 84 |
| 96 | 95 | 92 | 88 | 82 |

| 82 | 88 | 92 | 95 | 96 |
|---|---|---|---|---|
| 84 | 90 | 95 | 98 | 99 |
| 85 | 91 | 96 | 99 | 100 |
| 84 | 90 | 95 | 98 | 99 |
| 82 | 88 | 92 | 95 | 96 |

Or2

FIG.10D  $\Delta P = (P1-P2)/(P1+P2)$

| 0.079 | 0.040 | 0.000 | -0.040 | -0.079 |
|---|---|---|---|---|
| 0.079 | 0.039 | 0.000 | -0.039 | -0.079 |
| 0.079 | 0.039 | 0.000 | -0.039 | -0.079 |
| 0.079 | 0.039 | 0.000 | -0.039 | -0.079 |
| 0.079 | 0.040 | 0.000 | -0.040 | -0.079 |

FIG.10E $\Delta P'$

| 0.001 | 0.039 | 0.079 | 0.118 | 0.158 |
|---|---|---|---|---|
| 0.000 | 0.039 | 0.079 | 0.118 | 0.158 |
| 0.000 | 0.040 | 0.079 | 0.118 | 0.158 |
| 0.000 | 0.039 | 0.079 | 0.118 | 0.158 |
| 0.001 | 0.039 | 0.079 | 0.118 | 0.158 |

| 1.081 | 1.091 | 1.115 | 1.148 | 1.186 |
|---|---|---|---|---|
| 1.040 | 1.057 | 1.091 | 1.129 | 1.171 |
| 1.000 | 1.040 | 1.081 | 1.122 | 1.166 |
| 1.040 | 1.057 | 1.091 | 1.129 | 1.171 |
| 1.081 | 1.091 | 1.115 | 1.148 | 1.186 |

Or1

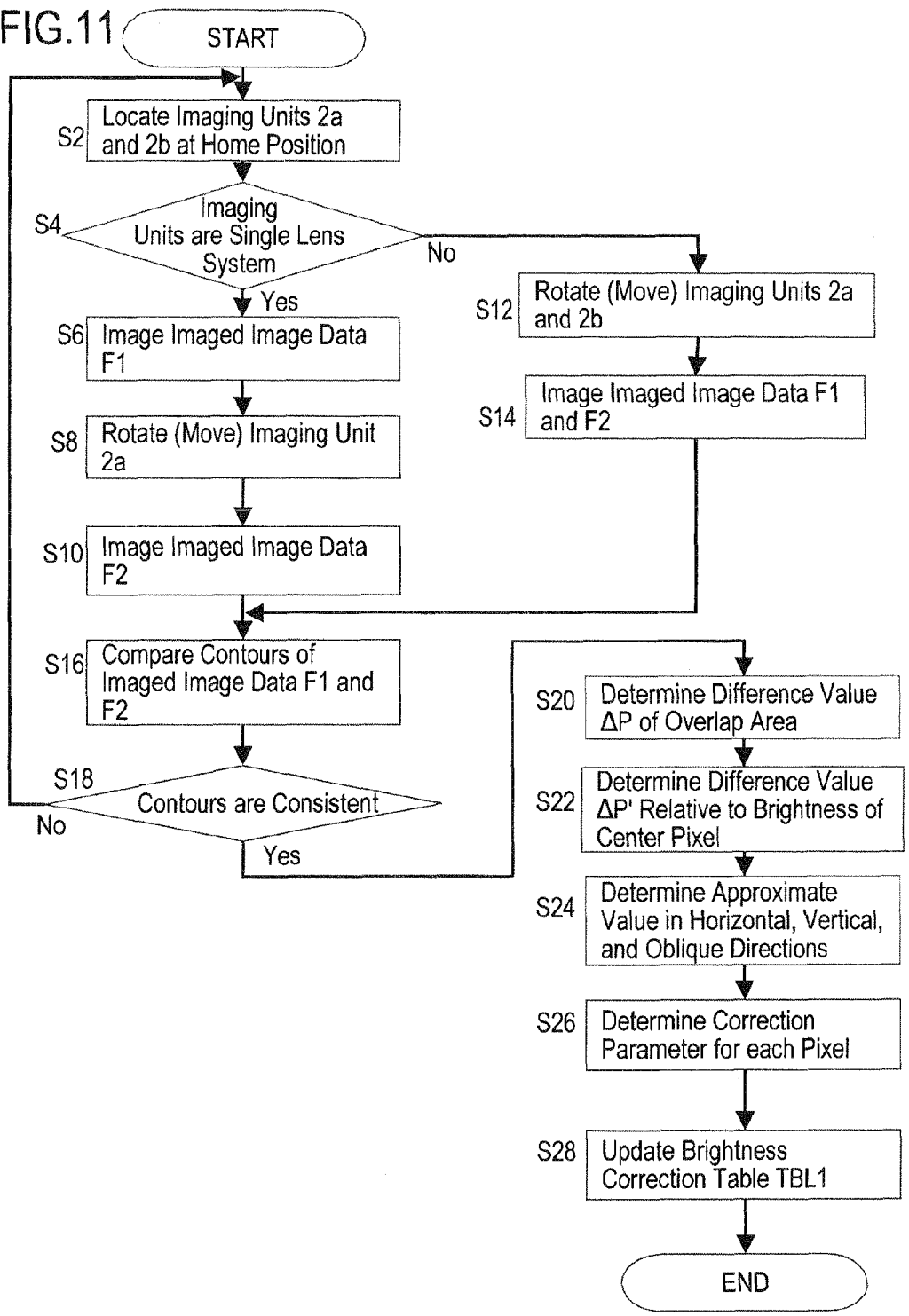

FIG.14A

| θ1 | 0 | 2 | 4 | ... | 86 | 88 | 90 |
|---|---|---|---|---|---|---|---|
| cos^4(θ1) | 1 | 0.997566 | 0.990292 | ... | 2.37E-05 | 1.48E-06 | 1.41E-65 |
| IP1 | 100 | 99.75655 | 99.02917 | ... | 0.002368 | 0.000148 | 1.41E-63 |

FIG.14B

| θ2 | 90 | 88 | 86 | ... | 4 | 2 | 0 |
|---|---|---|---|---|---|---|---|
| cos^4(θ2) | 1.41E-65 | 1.48E-06 | 2.37E-05 | ... | 0.990292 | 0.997566 | 1 |
| IP2 | 1.41E-63 | 0.000148 | 0.002368 | ... | 99.02917 | 99.75655 | 100 |

FIG.14C

| θ2 | 90 | 88 | 86 | ... | 4 | 2 | 0 |
|---|---|---|---|---|---|---|---|
| ΔIP=(IP1-IP2)/(IP1+IP2) | 1 | 0.999997 | 0.999953 | ... | 0.004878 | 0.001219 | 0 |

TBL3

FIG.15A

| 67 | 255 | 6 | 84 | 255 | 255 | 78 |
|---|---|---|---|---|---|---|
| 475 | 7 | 255 | 255 | 43 | 255 | 53 |
| 255 | 75 | 255 | 255 | 255 | 75 | 255 |
| 255 | 255 | 255 | 57 | 255 | 255 | 255 |
| 7 | 47 | 255 | 255 | 255 | 255 | 255 |
| 255 | 255 | 255 | 255 | 57 | 255 | 54 |
| 255 | 255 | 255 | 86 | 255 | 255 | 255 |

| 61 | 231 | 5 | 70 | 199 | 181 | 49 |
|---|---|---|---|---|---|---|
| 457 | 7 | 236 | 224 | 35 | 191 | 35 |
| 253 | 74 | 243 | 231 | 216 | 58 | 176 |
| 255 | 253 | 245 | 52 | 218 | 199 | 178 |
| 7 | 46 | 243 | 231 | 216 | 197 | 176 |
| 245 | 243 | 236 | 224 | 47 | 191 | 36 |
| 233 | 231 | 224 | 72 | 199 | 181 | 162 |

| 42 | 181 | 5 | 70 | 224 | 231 | 71 |
|---|---|---|---|---|---|---|
| 317 | 5 | 209 | 224 | 40 | 243 | 51 |
| 176 | 58 | 216 | 231 | 243 | 74 | 253 |
| 178 | 199 | 218 | 52 | 245 | 253 | 255 |
| 5 | 36 | 216 | 231 | 243 | 250 | 253 |
| 170 | 191 | 209 | 224 | 53 | 243 | 52 |
| 162 | 181 | 199 | 72 | 224 | 231 | 233 |

| 0.182 | 0.121 | 0.06 | 0 | -0.06 | -0.12 | -0.18 |
|---|---|---|---|---|---|---|
| 0.18 | 0.12 | 0.06 | 0 | -0.06 | -0.12 | -0.18 |
| 0.179 | 0.119 | 0.059 | 0 | -0.06 | -0.12 | -0.18 |
| 0.179 | 0.119 | 0.059 | 0 | -0.06 | -0.12 | -0.18 |
| 0.179 | 0.119 | 0.059 | 0 | -0.06 | -0.12 | -0.18 |
| 0.18 | 0.12 | 0.06 | 0 | -0.06 | -0.12 | -0.18 |
| 0.182 | 0.121 | 0.06 | 0 | -0.06 | -0.12 | -0.18 |

TBL3

| θ2 | 90 | 88 | 86 | ... |
|---|---|---|---|---|
| ΔIP=(IP1-IP2)/(IP1+IP2) | 1 | 0.999997 | 0.999953 | ... |

| | 26 | 24 | 22 | ... | 4 | 2 | 0 |
|---|---|---|---|---|---|---|---|
| | 0.210221 | 0.178898 | 0.150065 | ... | 0.004878 | 0.001219 | 0 |

| 12 | 13 | 14 | 17 | 20 | 23 | 27 |
|---|---|---|---|---|---|---|
| 8 | 9 | 11 | 14 | 18 | 22 | 25 |
| 4 | 6 | 9 | 13 | 16 | 20 | 24 |
| 0 | 4 | 8 | 12 | 16 | 20 | 24 |
| 4 | 6 | 9 | 13 | 16 | 20 | 24 |
| 8 | 9 | 11 | 14 | 18 | 22 | 25 |
| 12 | 13 | 14 | 17 | 20 | 23 | 27 |

| 0.915 | 0.906 | 0.88 | 0.837 | 0.78 | 0.711 | 0.634 |
|---|---|---|---|---|---|---|
| 0.962 | 0.952 | 0.925 | 0.88 | 0.82 | 0.749 | 0.668 |
| 0.99 | 0.981 | 0.952 | 0.906 | 0.845 | 0.772 | 0.689 |
| 1 | 0.99 | 0.962 | 0.915 | 0.854 | 0.78 | 0.696 |
| 0.99 | 0.981 | 0.952 | 0.906 | 0.845 | 0.772 | 0.689 |
| 0.962 | 0.952 | 0.925 | 0.88 | 0.82 | 0.749 | 0.668 |
| 0.915 | 0.906 | 0.88 | 0.837 | 0.78 | 0.711 | 0.634 |

Or1

US 8,736,696 B2

IMAGE PROCESSING APPARATUS, IMAGING APPARATUS AND IMAGE PROCESSING METHOD

CROSS-REFERENCE TO RELATED APPLICATION

This application is based upon and claims the benefit of priority of the prior Japanese Patent Application No. 2010-181793, filed on Aug. 16, 2010, the entire contents of which are incorporated herein by reference.

FIELD

Embodiments discussed herein relate to an image processing apparatus etc. performing the brightness correction of an imaged image data.

BACKGROUND

An imaging apparatus having an optical lens performs imaging by image-forming an object image on a film, an imaging device, etc. by the optical lens. At this time, a phenomenon, which is referred to as shading, is produced, in which the brightness of the formed image is gradually decreased from the center of the lens to the peripheral area, according to the optical characteristic of the lens and the imaging area of the imaging device. In order to eliminate the shading in a digital still camera etc., methods for correcting the brightness of the imaged image data have been discussed, for example, in Japanese Unexamined Patent Publication No. 2000-134631 and No. 2004-289746.

As an example of the brightness correction, in the manufacturing process of the imaging apparatus, there are executed a process of imaging an object having a uniform brightness, and detecting an attenuation amount of the brightness according to the distance from the center of the imaged image, and a process of generating a brightness correction table, having a correction parameter according to the brightness attenuation amount stored therein, and storing it into a rewritable memory. When a user images, an image processing apparatus in the imaging apparatus corrects the brightness of the imaged image data using the correction parameter read out from the brightness correction table.

The brightness attenuation characteristic of the imaged image caused by the shading is different dependent on the optical characteristic of the lens and the imaging area of the imaging device. Therefore, for example, in such a case that the user exchanges an original lens to another lens having a different optical characteristic after the shipment of the imaging apparatus, appropriate correction is not made if the originally stored brightness correction table is used. Also, if a data stored in the memory is rewritten or erased, the brightness correction becomes difficult to be made. In such cases, it will lead to the increase of work and cost on the manufacturer side to reset the brightness correction table by collecting the imaging apparatus, besides causing user inconvenience.

SUMMARY

According to an aspect of an embodiment, an image processing apparatus includes: a computing unit which determines a first difference value between brightness of a first image data and brightness of a second image data in an overlap area of the first image data including a first brightness characteristic with the second image data having a peripheral area at the center of the first image data and including a second brightness characteristic; and a generating unit which generates a brightness correction parameter for the first image data corresponding to the first difference value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 2A and 2B depict brightness correction by the image processing apparatus;

FIGS. 10A-10F depict the first processing example;

FIG. 11 depicts the operational procedure in the imaging apparatus;

FIGS. 14A-14C depict the theoretical difference values of the brightness of the imaged image data;

FIGS. 15A-15D depict the second processing example;

FIGS. 16A-16C depict the second processing example;

DESCRIPTION OF EMBODIMENTS

Embodiments will be described hereinafter according to the drawings. However, it is noted that the technical scope is not limited to the embodiments described below, but covers the matters described in the claims and the equivalents thereof.

Figure 1:
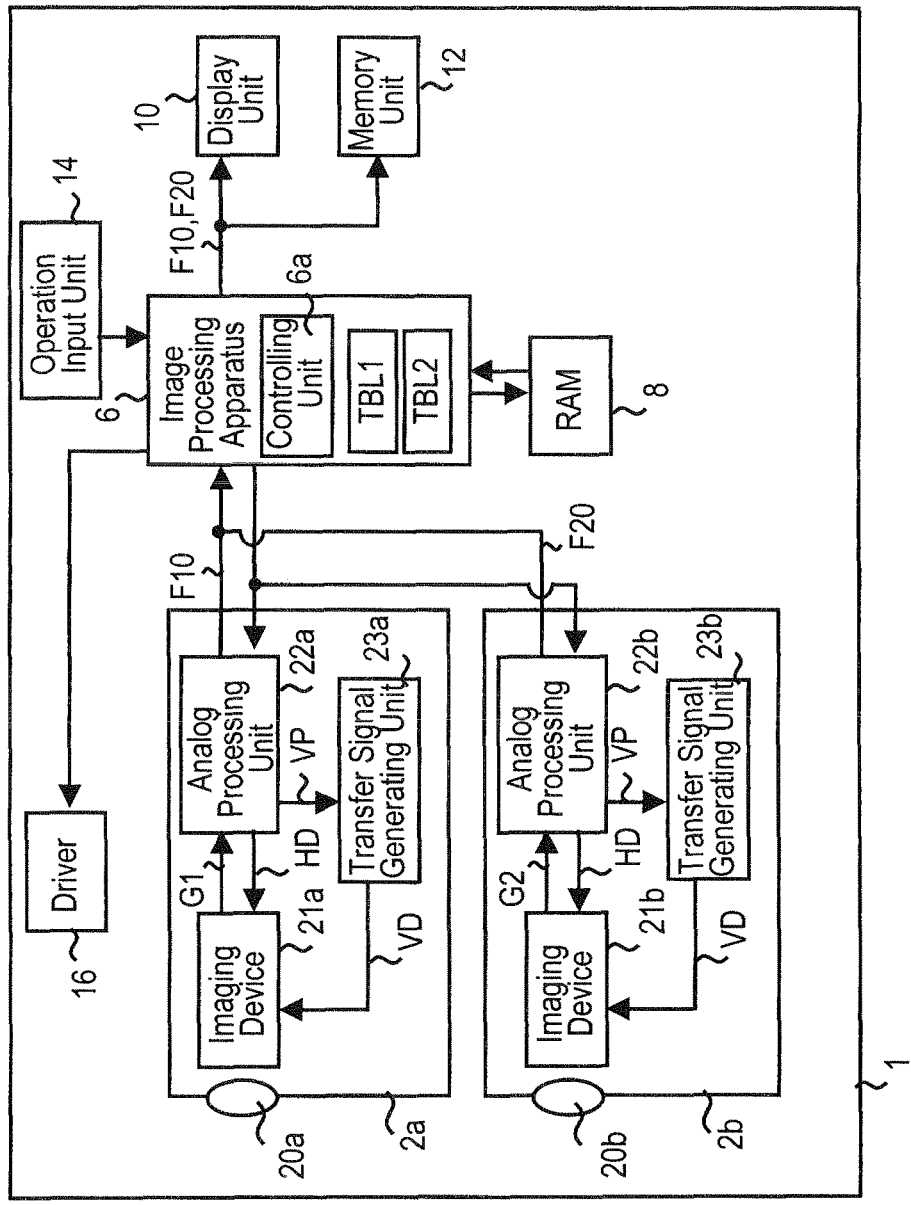
FIG. 1 depicts an example of a configuration of an imaging apparatus.

FIG. 1 is a diagram depicting the according to a present embodiment. The imaging apparatus 1 is a digital still camera for imaging stereo images, which images an object by two imaging units 2a and 2b. In the imaging unit 2a, a lens 20a image-forms light received from the object on an imaging plane of an imaging device 21a as an object image. The imaging device 21a includes a CCD (Charge Coupled Device) image sensor for example, and generates a charge of which quantity corresponds to the quantity of light of the object image, as a pixel value signal G1. The imaging device 21a transfers the pixel value signal G1 according to a vertical transfer signal VD being input from a transfer signal generating unit 23a, and a horizontal transfer signal HD being input from an analog processing unit 22a, and outputs the pixel value signal G1 to the analog processing unit 22a. The analog processing unit 22a performs A/D conversion after amplifying the pixel value signal G1 on a frame-by-frame basis, and outputs to an image processing apparatus 6, as an imaged image data F10. Also, the analog processing unit 22a inputs to the transfer signal generating unit 23a a control signal VP to instruct to generate the vertical transfer signal VD.

Further, the imaging unit 2b includes lens 20b, imaging device 21b, analog processing unit 22b and transfer signal generating unit 23b, which are equivalent to lens 20a, imaging device 21a, analog processing unit 22a and transfer signal generating unit 23a, respectively, with an equivalent configuration to the imaging unit 2a. In the imaging unit 2b, the imaging device 21b generates a pixel value signal G2. Also, the analog processing unit 22b generates an imaged image data F20 from the pixel value signal G2, and outputs the imaged image data F20 to the image processing apparatus 6.

In the imaging unit 2a, it is also possible to configure the imaging device 21a, the analog processing unit 22a and the transfer signal generating unit 23a using a CMOS (Complementary Metal Oxide Semiconductor) image sensor. Also, the same configuration is applicable to the imaging unit 2b.

The image processing apparatus 6 includes a CPU (Central Processing Unit) for executing a control program and an image processing program, or a DSP (Digital Signal Processor). The image processing apparatus 6 stores the imaged image data F10 and F20 which are output from the analog processors 22a and 22b into a RAM (Random Access Memory) 8, and performs a variety of kinds of image processing on the above data F10 and F20. For example, the image processing apparatus 6 performs image processing such as smear correction, black correction, noise reduction, white balance, RGB (Red, Green and Blue) conversion, color correction and γ correction. Further, the image processing apparatus 6 separates each pixel value of the imaged image data F10 and F20 into brightness and a color difference, and in regard to the brightness, performs contour correction and brightness correction to eliminate shading. The image processing apparatus 6 includes brightness correction tables TBL1 and TBL2 that are referred to in the brightness correction. The brightness correction will be described in detail later.

The imaged image data F10 and F20 after the image processing are output to a display unit 10 and a memory unit 12. The display unit 10 displays the imaged images corresponding to the imaged image data F10 and F20, on a display screen including, for example, LCD (Liquid Crystal Display). The memory unit 12 reads and writes the imaged image data F10 and F20 from/to external memory media such as a rewritable ROM (Read Only Memory) and a memory card.

An operation input unit 14 accepts an operation from a user, and inputs a control signal corresponding to the operation to the image processing apparatus 6. In response thereto, a controlling unit 6a of the image processing apparatus 6 generates a control signal to control the operation of the imaging apparatus 1, so as to output to each unit of the imaging apparatus 1. For example, the controlling unit 6a outputs to a driver 16 a control signal to rotate or move each imaging unit 2a, 2b, or outputs to the analog processors 22a and 22b control signals to allow the imaging units 2a and 2b to perform imaging. By this, in the imaging operation described later, the imaging units 2a and 2b are rotated or moved to vary the direction of imaging, or images the object, under the control of the controlling unit 6a.

FIGS. 2A and 2B are diagrams depicting brightness correction by the image processing apparatus 6. In the image formation by the optical lens, shading is produced, in which the brightness is attenuated in a concentric circle shape from the center of the view angle toward the peripheral area. In FIG. 2A, the number of pixels of the imaged image data F10 in the diameter direction of the lens 20a is depicted in the horizontal axis, while the brightness of each pixel is depicted in the vertical axis. Here, there is depicted a brightness C1 when an object having a uniform brightness is imaged. Because of including the shading, the brightness C1 depicts a curve that indicates attenuation from the center of the lens 20a toward the left and right edge portions. Hereinafter, an attenuation factor of the brightness, which is relative to the brightness at the center, and dependent on the distance from the center, is referred to as a brightness characteristic. The brightness characteristic corresponds to the view angle based on the focus distance of the lens 20a and the area of the imaging device 21a.

FIG. 2B depicts an example of the brightness correction table TBL1 for correcting the brightness C1 depicted in FIG. 2A. Here, a correction amount C2 is depicted as a brightness correction parameter on a pixel-by-pixel basis. The correction amount C2 depicts a curve that increases from the center of the lens 20a toward the peripheral area, corresponding to the brightness characteristic of the brightness C1. The image processing apparatus 6 corrects the pixel-by-pixel brightness C1 of the imaged image data F10, using the correction amount C2 read out from the brightness correction table TBL1. By this, the brightness C1 depicted in FIG. 2A is corrected to a brightness C3 that is equivalent to the brightness at the center of the lens 20a.

The above explanation is also applicable to the lens 20b, the imaged image data F2 and the brightness correction table TBL2.

The brightness correction tables TBL1 and TBL2 as described above are determined in advance by a test etc. in the manufacturing process etc. of the imaging apparatus 1. The above tables are stored into a rewritable memory in the image processing apparatus 6. Therefore, manufacturing work and cost thereof may be required. Further, after the shipment of the imaging apparatus 1, if the lenses 20a and 20b are exchanged to other lenses having different optical characteristics, it becomes difficult to perform appropriate correction, as long as the original brightness correction tables TBL1 and TBL2 are used. Further, after the imaging apparatus 1 is started to use after the shipment, if the brightness correction tables TBL1 and TBL2 are rewritten or erased due to some reason, the brightness correction becomes difficult to be performed.

Now, according to the present embodiment, the image processing apparatus 6 determines a brightness correction parameter suitable for the combination of the lenses 20a and 20b and the imaging devices 21a and 21b, either in response to an instruction input from the user, or automatically at a certain period, or the like. By use of the above determined parameter, the brightness correction tables TBL1 and TBL2 are updated. For example, the imaging units 2a and 2b obtain a pair of imaged image data in which the center of one image is located in the peripheral area of the other. Then, using the obtained pair of imaged image data, the image processing apparatus 6 determines the correction parameter to update each brightness correction table TBL1, TBL2.

Figure 3A:
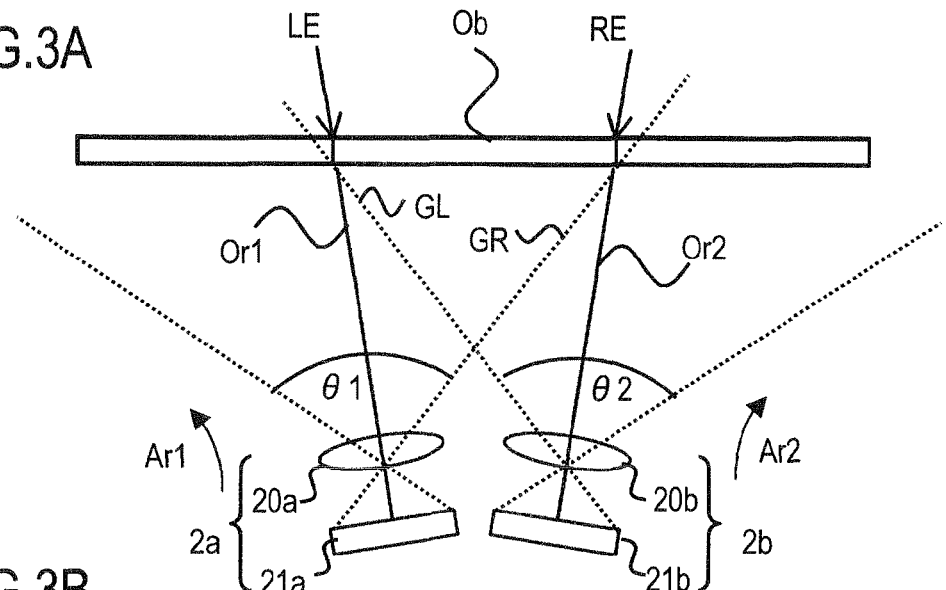
FIGS. 3A-3C depict imaging operation to obtain the pair of imaged image data.
Figure 3B:
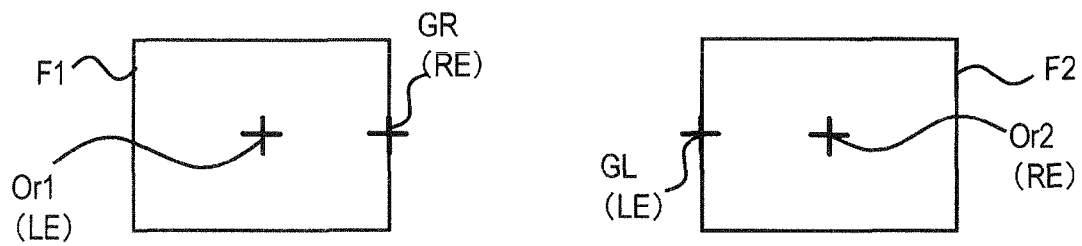
Figure 3C:
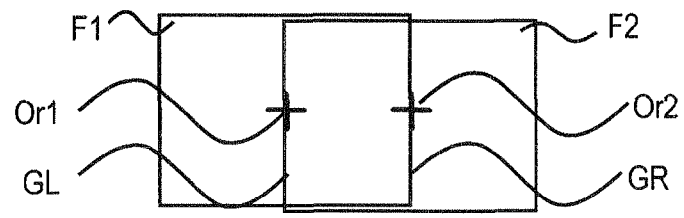

FIGS. 3A-3C are diagrams depicting the imaging operation of the imaging units 2a and 2b to obtain the pair of imaged image data. Preferably, the imaging operation depicted in FIGS. 3A-3C is executed in a state that the imaging apparatus 1 is secured.

Here, because the configurations of the imaging unit 2a and the imaging unit 2b are identical, the view angles θ1 and θ2 respectively produced by the combination of the lens 20a with the imaging device 21a and the combination of the lens 20b with the imaging device 21b are identical. Also, the respective imaged images have an identical brightness characteristic.

First, when located at home positions, the imaging units 2a and 2b have the imaging directions (the center directions of the view angles θ1 and θ2) directed forward and in parallel. By the driver 16 controlled by the image processing apparatus 6, the imaging unit 2a on the left side is rotationally moved to the left direction (arrow Ar1), and also the imaging unit 2b on the right side is rotationally moved to the right direction (arrow Ar2), respectively from the home positions thereof. Alternatively, one of the imaging units 2a and 2b is rotationally moved. Then, the imaging units 2a and 2b perform imaging, respectively.

At this time, the center Or1 of the view angle θ1 and the left edge portion GL of the view angle θ2 are located at a portion LE on the relatively left side of the object Ob. Also, the right edge portion GR of the view angle θ1 and the center Or2 of the view angle θ2 are located at a portion RE on the relatively right side of the object Ob. Then, as depicted in FIG. 3B, the imaged image data F1 generated by the imaging unit 2a has an image of the portion LE at the center Or1 and an image of the portion RE at the right edge portion GR. On the other hand, the imaged image data F2 generated by the imaging unit 2b has an image of the portion LE at the left edge portion GL and an image of the portion RE at the center Or2. Accordingly, if the imaged image data F1 and the imaged image data F2 in regard to the image of the object Ob are mutually overlaid, the center Or1 of the imaged image data F1 is located at the left edge portion GL of the imaged image data F2, while the center Or2 of the imaged image data F2 is located at the right edge portion GR of the imaged image data F1, as depicted in FIG. 3C. As such, the imaged image data F1 and F2 are obtained in such a manner that the center of one is located in the peripheral area of the other.

Figure 4A:
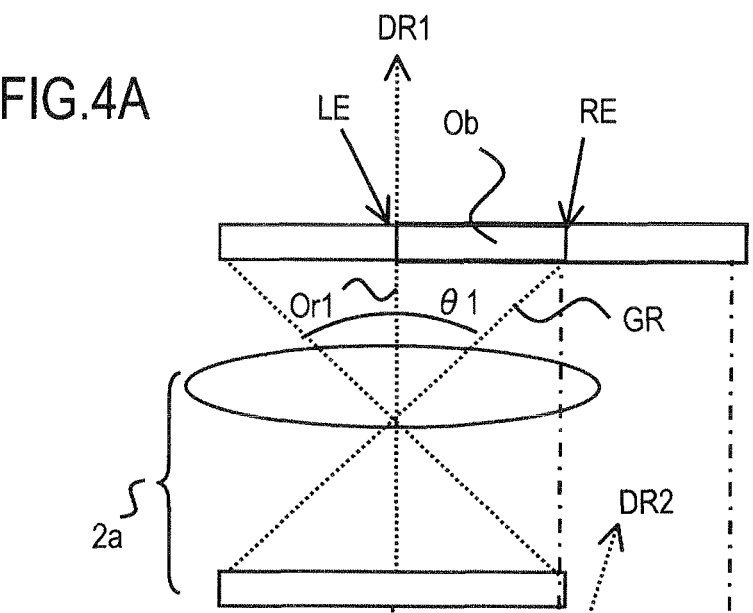
FIGS. 4A and 4B depict imaging operation by a single lens system.
Figure 4B:
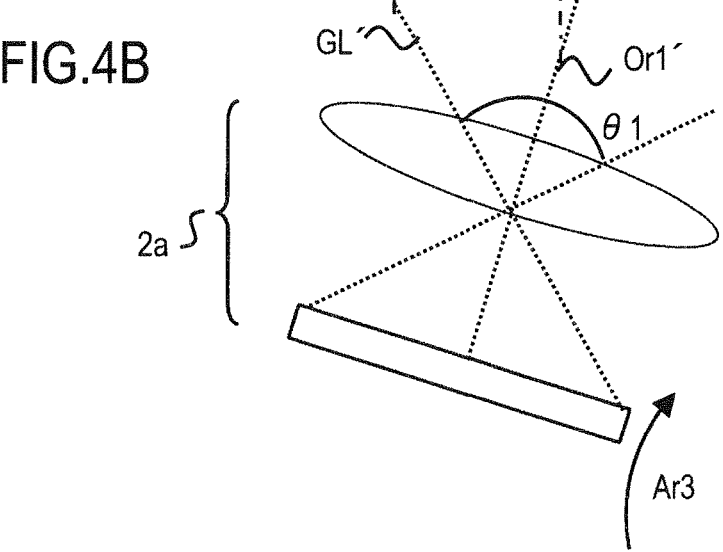

In case the imaging apparatus 1 is a single lens system having solely the imaging unit 2a, such imaging operation as depicted in FIGS. 4A and 4B is carried out. First, as depicted in FIG. 4A, the imaging unit 2a performs first imaging with an imaging direction DR1. Then, after rotationally moved to the right direction (arrow Ar3) as depicted in FIG. 4B, the imaging unit 2a performs second imaging. At the first imaging, the imaging unit 2a images the portion LE of the object Ob at the center Or1 of the view angle θ1, and also images the portion RE of the object Ob at the right edge portion GR of the view angle θ1. Then, at the second imaging, the imaging unit 2a images the portion LE at the left edge portion GL' of the view angle θ1, and also images the portion RE at the center Or2' of the view angle θ1. By this, such the imaged image data F1 as depicted in FIGS. 3B and 3C is obtained by the first imaging, and also the imaged image data F2 is obtained by the second imaging. In such a manner, even in the case of the single-lens imaging unit 2a, it is possible to obtain the imaged image data F1 and F2 in which the center of one is located in the peripheral area of the other.

Figure 5:
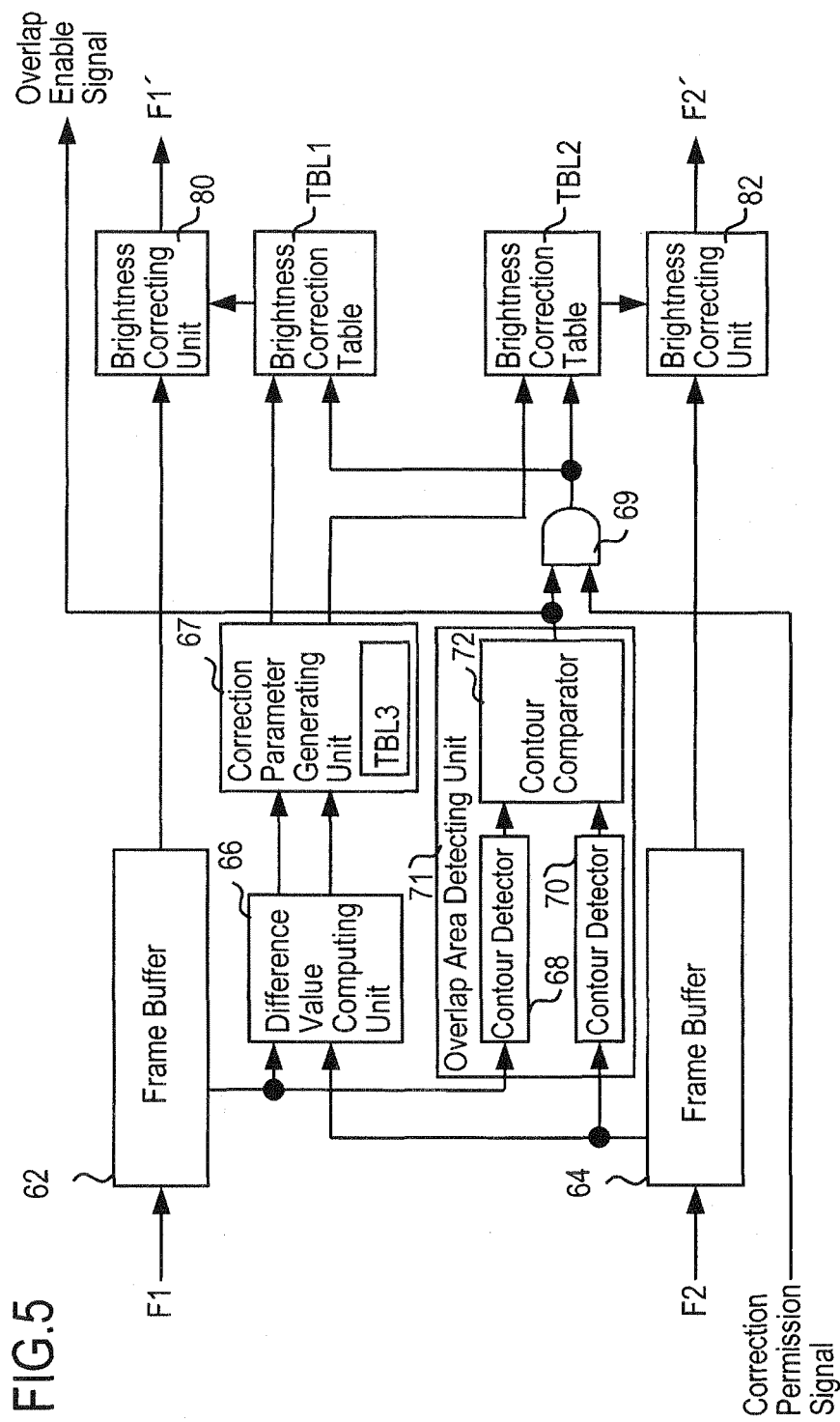
FIG. 5 depicts a detailed example of a configuration of the image processing apparatus.

FIG. 5 depicts a detailed configuration of the image processing apparatus 6 to update the brightness correction table TBL. The image processing apparatus 6 includes: frame buffers 62 and 64 for storing the imaged image data F1 and F2 being input from the imaging units 2a and 2b, respectively; an overlap area detecting unit 71 for detecting an overlap area from the imaged image data F1 and F2; a difference value computing unit 66 for determining a difference value of the brightness of the imaged image data F1 and F2 in the overlap area on a pixel-by-pixel basis; and a correction parameter generating unit 67 for determining a brightness correction parameter from the difference value. In the following description, there are depicted two kinds of processing examples performed in the correction parameter generating unit 67 according to the present embodiment. As a configuration for the second processing example, a difference value table TBL3 is stored in the correction parameter generating unit 67. Detailed description thereof will be given later.

In the overlap area detecting unit 71, contour detectors 68 and 70 detect high frequency components of the imaged image data F1 and F2, respectively, and detect the contours of the images indicating the object Ob. Next, a contour comparator 72 compares between the image contours respectively detected by the contour detectors 68 and 70, and outputs the result indicative of either consistency ("1") or inconsistency ("0") as an overlap enable signal. The overlap enable signal is input into an upper-level controlling unit (not depicted), which controls the configuration depicted in FIG. 5, and an AND circuit 69. Thereafter, when a correction permission signal "1", indicative of the permission of correction, is input from the upper-level controlling unit to the AND circuit 69, a signal "1" corresponding to the write permission is output from the AND circuit 69 to both the brightness correction table TBL1 for the imaged image data F1 and the brightness correction table TBL2 for the imaged image data F2.

Then, each correction parameter determined by the correction parameter generating unit 67 is stored into the brightness correction tables TBL1 and TBL2. In such a manner, the brightness correction tables TBL1 and TBL2 are updated. Thereafter, based on the updated brightness correction tables TBL1 and TBL2, brightness correcting units 80 and 82 correct the brightness of the imaged image data F1 and F2, respectively. Thus, corrected imaged image data F1' and F2' are output.

Figure 6A:
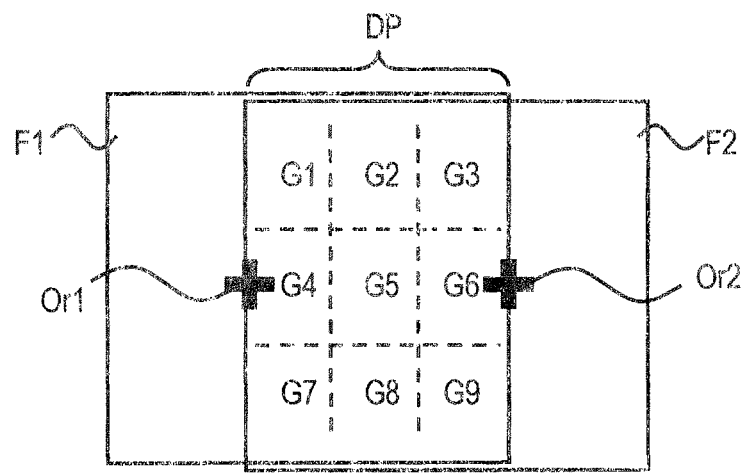
FIGS. 6A and 6B depict overlap area detecting.
Figure 6B:
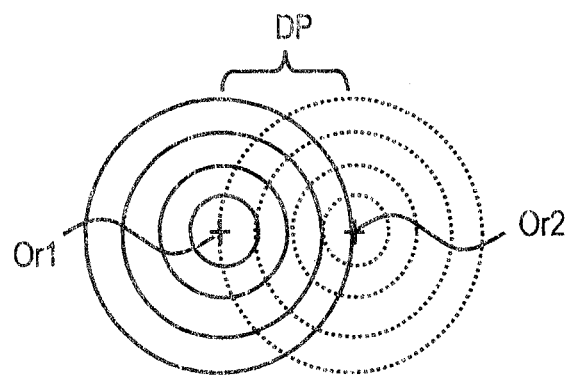

FIG. 6A is a diagram depicting the processing of the overlap area detecting unit 71. As depicted in FIG. 6A, the overlap area detecting unit 71 detects pixels G1-G9 forming the imaged image (for convenience of explanation, a case of 9 pixels is exemplified) by the comparison of the image contours of the imaged image data F1 and F2 in an overlap area DP. Here, the pixel G4 corresponds to the center Or1 of the imaged image data F1, while the pixel G6 corresponds to the center Or2 of the imaged image data F2. As depicted in FIG. 6B, shading states in the imaged image data F1 and F2 having brightness attenuated from the respective centers Or1, Or2 in a concentric circle shape are schematically depicted. Here, in the overlap area DP, the brightness characteristics of the imaged image data F1 and F2 are opposite to each other.

Next, in regard to processing for deriving difference values by the difference value computing unit 66 and processing for generating correction parameters by the correction parameter generating unit 67, two kinds of processing examples are explained below.

FIRST PROCESSING EXAMPLE

Figure 7A:
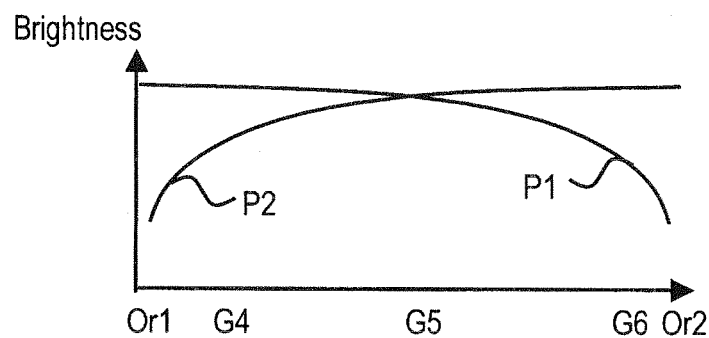
FIGS. 7A and 7B depict deriving difference values in the first processing example.
Figure 7B:
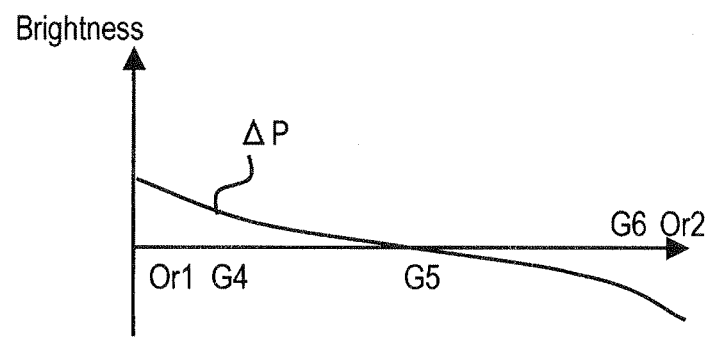

FIGS. 7A and 7B are diagrams depicting the processing for deriving difference values in the first processing example. FIG. 7A depicts the brightness (vertical axis) of the pixels G4-G6 (horizontal axis) between the centers Or1, Or2 in the overlap area DP. In this figure, for facilitating understanding, there are depicted brightness P1 of the imaged image data F1 and brightness P2 of the imaged image data F2 in the imaged images having uniform brightness. Here, the brightness P1 and the brightness P2 are depicted as the approximation curves of the brightness of the pixels G4-G6. The brightness P1 of the imaged image data F1 attenuates from the pixel G4 toward G6, namely from the center Or1 of the imaged image data F1 toward the center Or2 of the imaged image data F2.

On the other hand, the brightness P2 of the imaged image data F2 attenuates from the pixel G6 toward G4, namely from the center Or2 of the imaged image data F2 toward the center Or1 of the imaged image data F1.

The difference value computing unit 66 determines each difference value of the brightness ΔP=(P1−P2)/(P1+P2) of each pixel G4-G6 between the centers Or1 and Or2. Such the difference value ΔP is depicted in FIG. 7B. Here, a normalized difference value ΔP is determined by dividing the difference between the brightness P1, P2, i.e. (P1−P2) by the sum (P1+P2). By this, irrespective of the magnitude of the imaged image brightness, the difference value may be obtained in an identical scale.

Figure 8A:
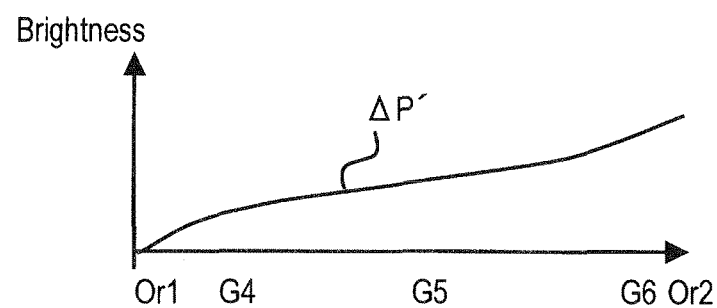
FIGS. 8A and 8B depict generating correction parameters in the first processing example.
Figure 8B:
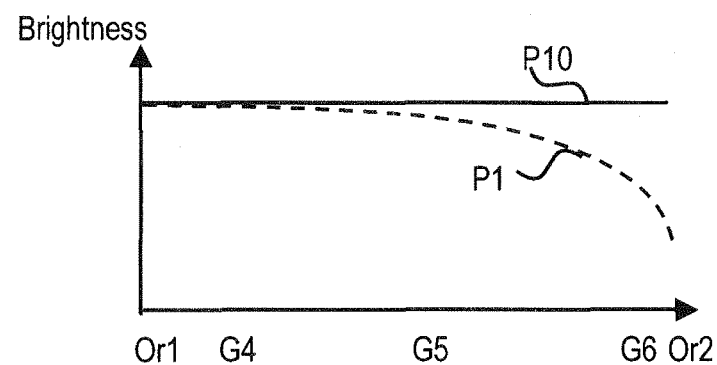

FIGS. 8A and 8B are diagrams depicting the processing from generating correction parameters in the first processing example. From the difference value ΔP depicted in FIG. 7B, the correction parameter generating unit 67 determines a difference value ΔP' relative to the brightness of the center Or1 in the imaged image data F1. FIG. 8A depicts the above difference value ΔP'. In contrast that the difference value ΔP depicted in FIG. 7B zero-crosses at the pixel G4, the difference value ΔP' is obtained by adding an offset and inverting the sign. Namely, the difference value ΔP' is obtained by inverting the difference value ΔP and giving an intercept at brightness "0". Here, the horizontal axis corresponds to the distance (the number of pixels) from the center Or1, and the difference value ΔP' according to the distance from the pixel G4 at the center Or1 of the imaged image data F1 is determined as a brightness correction amount for each pixel.

The correction parameter generating unit 67 stores each correction parameter based on such the difference value ΔP' into the brightness correction table TBL1. According to such the correction parameter, the brightness P1 of the imaged image data F1 is corrected to brightness P10, which is equivalent to the brightness of the center Or1, as depicted in FIG. 8B.

Figure 9A:
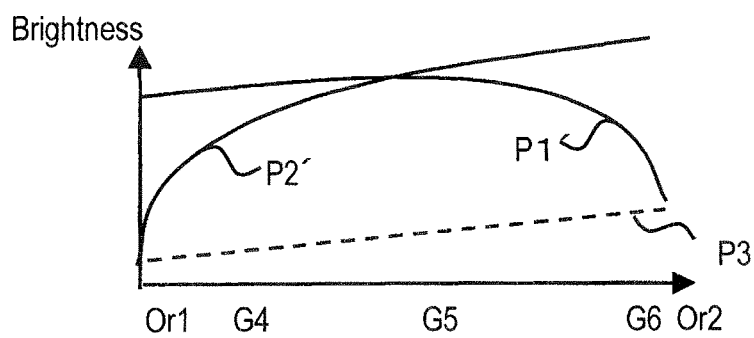
FIGS. 9A and 9B depict a process for imaged image data with uneven brightness.

Now, processing for an imaged image having uneven brightness, such as a natural image, will be described by reference to FIGS. 9A and 9B. FIG. 9A depicts brightness P1' and P2' of the imaged image data F1 and F2 in the natural image and the like. Here, brightness P3 is overlapped on the pixels G4-G6 between the centers Or1 and Or2. In this case also, through the acquisition of the difference value ΔP, an overlapped amount of the brightness P3 of the natural image is canceled by a brightness difference P1'-P2'. As a result, it is possible to obtain the same difference value ΔP as in the case of the acquisition from the brightness P1, P2 depicted in FIG. 7B. As such, even in the case of the imaged image having uneven brightness, it is possible to obtain a difference value ΔP=(P1−P2)/(P1+P2) using the opposite brightness characteristics of the imaged image data F1 and F2.

Figure 9B:
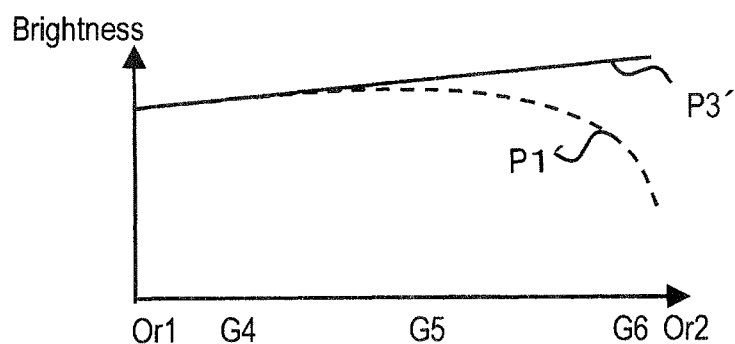

Then, by the correction of the brightness using the difference value ΔP' depicted in FIG. 8A, brightness P1' is corrected to brightness P3', as depicted in FIG. 9B. The brightness P3' corresponds to the brightness P3 of the natural image relative to the center Or1 as a criterion, in which shading is canceled. As such, even when the natural image and the like having uneven brightness is used, it is possible to appropriately update the brightness correction table TBL1.

Also, by the execution of the similar processing to the above-mentioned processing on the imaged image data F2, the correction table TBL2 is updated.

Now, the processing described in FIGS. 7A through 9B will be described by use of examples.

FIG. 10A through 10F are diagrams depicting the first processing example by use of the examples of the brightness of the imaged image data F1 and F2. FIG. 10A depicts original brightness of the imaged image data F1 and F2 in the overlap area. Here, each square unit corresponds to each pixel, and the numeric value included therein indicates the brightness of each pixel. FIG. 10B depicts the brightness P1 of the imaged image data F1 that includes shading. The pixel at the center Or1 has original brightness "100", and however, the pixel brightness gradually attenuates from the center Or1 in a concentric circle shape. On the other hand, FIG. 10C depicts the brightness P2 of the imaged image data F2 that includes shading. The pixel at the center Or2 has original brightness "100", and however, the pixel brightness gradually attenuates from the center Or2 in a concentric circle shape. Here, the brightness characteristics of the imaged image F1, F2 at the brightness P1, P2 have opposite relationship from the respective centers Or1, Or2, as depicted in FIGS. 10B and 10C.

Next, FIG. 10D depicts each difference value ΔP=(P1−P2)/(P1+P2) determined from the brightness P1, P2 depicted in FIGS. 10B and 10C. Also, FIG. 10E depicts a state that each difference value ΔP' relative to the reference brightness of the imaged image data F1 at the center Or1 is determined from ΔP. Here, the pixel brightness at the center Or1 is converted into "0", and also, the brightness of other pixels is converted into a difference value relative to "0". The difference value ΔP' thus determined corresponds to a correction amount. By storing the above correction amount ΔP' into the brightness correction table TBL1 as a correction parameter, it is possible to update the brightness correction table TBL1. Alternatively, as described below, it is also possible to determine a correction coefficient corresponding to the difference value ΔP', and store it into the brightness correction table TBL1 as correction parameter.

FIG. 10F depicts the correction coefficient corresponding to the difference value ΔP' depicted in FIG. 10E. First, from the difference value ΔP', the correction parameter generating unit 67 determines an approximation equation in the horizontal and vertical axis directions. For example, the approximation equation as depicted below is determined.

Horizontal axis direction:

$$y=9E-16X^4+5E-0.5X^3-0.0003X^2-2E-06X+2E-19$$

Vertical axis direction: $y=0.0001X^2-2E-06X+2E-19$ (where X is the number of pixels from the center Or1.)

Then, using the above approximation equation, the correction parameter generating unit 67 determines an approximate value y corresponding to the distance (the number of pixels) from the center Or1 in the horizontal and vertical axis directions. Thereafter, by adding an integer "1" to the above approximate value y, the correction parameter generating unit 67 determines a multiplier coefficient for the brightness of each pixel. Here, also for pixels in the oblique direction from the center Or1, the correction coefficient is determined from the above approximate values y in the horizontal and vertical axis directions, by the Pythagorean theorem. In such a manner, it is possible to apply the correction parameters obtained between the centers Or1 and Or2 to the entire pixels in the overlap area. By multiplying such the coefficients by the brightness P1 of the imaged image data F1 depicted in FIG. 10B, it is possible to perform correction to the original brightness depicted in FIG. 10A. Further, in regard to the entire imaged image data F1, since the brightness attenuates in a concentric circle shape from the center Or1, it is possible to apply the correction parameters to the entire directions of pixels by storing, as each correction parameter, not a correction amount but a multiplier coefficient, correspondingly to the distance from the center Or1. Thus, it is also possible to correct the brightness of the pixels, which are not depicted here in the figure, outside the overlap area. In other words, even when the brightness is different among a plurality of pixels having the same distance from the center, it is possible to perform appropriate brightness correction by uniformly multiplying the coefficient.

Further, by performing processing depicted in FIGS. 10E, 10F with regard to the center Or2, it is possible to obtain each brightness correction parameter for the imaged image data F2, and to update the brightness correction table TBL2.

FIG. 11 is a flowchart depicting the operational procedure in the imaging apparatus 1 according to the present embodiment. Processes S2-S14 relate to the procedure of imaging operation to determine the imaged image data F1 and F2. The controlling unit 6a of the image processing apparatus 6 confirms that the imaging units 2a and 2b are located at the respective home positions (S2). Next, in case the imaging units are not a single lens system (No in S4), the controlling unit 6a adjusts an imaging direction by either rotating or moving the imaging units 2a and 2b (or solely the imaging unit 2a) (S12). Subsequently, the image processing apparatus 6 allows the imaging units 2a and 2b to execute the acquisition of imaged image data F1 and F2 (S14). Here, processes S12-S14 correspond to the imaging operation depicted in FIGS. 3A-3B.

On the other hand, in case that the imaging unit 2a is a single lens system (Yes in S4), first, the controlling unit 6a allows the imaging unit 2a to execute imaging of the imaged image data F1 (S6). Next, the image processing apparatus 6 rotates (or moves) the imaging unit 2a (S8), and allows the execution of imaging the imaged image data F2 (S10). Here, processes S6-S10 correspond to the imaging operation depicted in FIGS. 4A-4B.

Processes S16-S28 relate to an image processing procedure. The overlap area detecting unit 71 compares the contours of the detected images of the imaged image data F1 and F2 stored in the frame buffers 62 and 64 (S16). When the contours are inconsistent (No in S18), the imaging procedure of processes S2-S14 is executed, so that the imaged image data F1 and F2 are acquired again.

On the other hand, when the contours are consistent (Yes in S18), processes S20-S28 are executed. Processes S20-S28 relate to the processing for deriving a first difference value and for generating correction parameters.

The difference value computing unit 66 determines a difference value $\Delta P$ of the imaged image data F1 and F2 in the overlap area, on a pixel-by-pixel basis (S20). Then, from the pixel-by-pixel difference value $\Delta P$, the correction parameter generating unit 67 determines a difference value $\Delta P'$ relative to the brightness of the imaged image data F1 at the center pixel (S22). The correction parameter generating unit 67 then determines an approximate value y related to each pixel in the horizontal and vertical axis directions and oblique directions from the center pixel (S24). Then, the correction parameter generating unit 67 determines a correction parameter for each pixel (S26). The correction parameter generating unit 67 then stores the correction parameter into the brightness correction table TBL1, and thus, the brightness correction table TBL1 is updated (S28).

Also, by the execution of the above-mentioned processes S22-S26 for the imaged image data F2, the brightness correction table TBL2 is updated in process S28.

Through the above-mentioned procedure, the brightness correction tables TBL1 and TBL2 are updated even after the shipment of the imaging apparatus 1. Further, by determining the difference values using the opposite brightness characteristics of the imaged image data F1 and F2, it is possible to determine appropriate correction parameters even in case of an imaged image having uneven brightness, such as a natural image. Accordingly, even if the user exchanges the lens at discretion, it is possible to image a natural image and update the brightness correction tables TBL1 and TBL2 each time by the correction parameter suitable for the lens. Thus, user convenience is improved.

SECOND PROCESSING EXAMPLE

The second processing example relates to the acquisition of the correction parameter using the cosine fourth law. According to the known cosine fourth law, brightness at a view angle $\theta$ from the lens center of 0 degree relative to the brightness of the lens center has a proportion of $\cos^4\theta$. Though the view angle $\theta$ is uniquely determined from the focal distance of the lens and the size of an imaging plane, the focal distance of the lens becomes unknown if the user exchanges the lens to another. Therefore, the view angle becomes an unknown. Accordingly, in the second processing example, the view angle of the imaged image data F1 or F2 at the edge portion is determined from the difference values between the imaged image data F1 and F2, so that the correction parameter is determined from the cosine fourth law.

Figure 12:
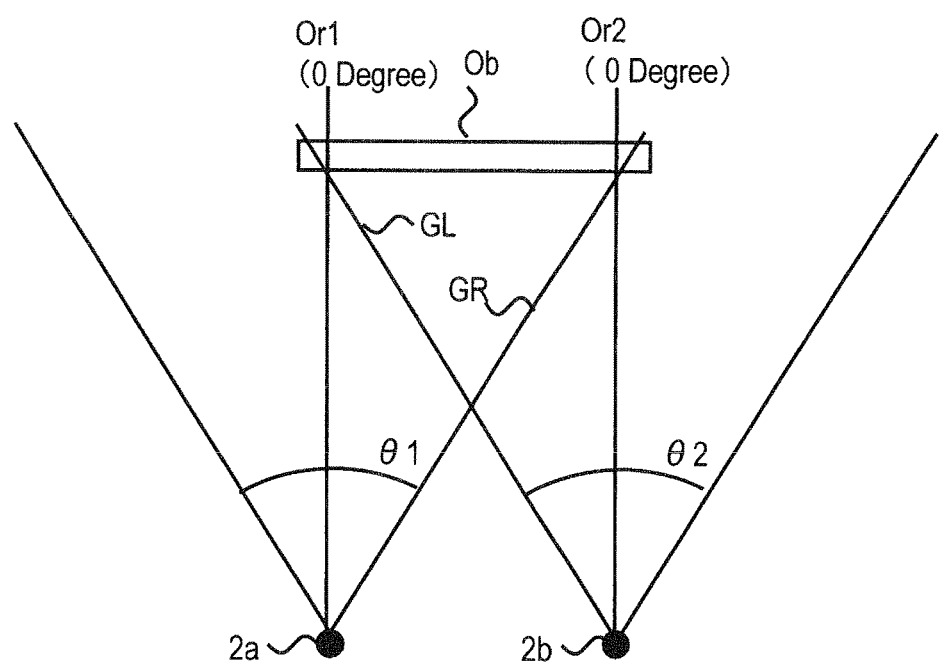
FIG. 12 depicts the view angle of the imaged image data.

FIG. 12 is a diagram depicting the view angle of the imaged image data F1 and F2. According to the present embodiment, the imaging units 2a and 2b image the object Ob with view angles $\theta 1$ and $\theta 2$ (=$\theta 1$), respectively. Here, imaging is made in such a manner that both the center Or1 of the view angle $\theta 1$ and the left edge portion GL of the view angle $\theta 2$ are located at the portion LE of the object Ob, and also both the right edge portion GR of the view angle $\theta 1$ and the center Or2 of the view angle $\theta 2$ are located at the portion RE of the object Ob. Here, in regard to the view angle $\theta 1$, the center Or1 has "0" degree. However, the right end portion GR has an unknown degree. Meanwhile, in regard to the view angle $\theta 2$, similarly, the center Or2 has "0" degree, and however, the left edge portion GL has an unknown degree. Now, using that the right edge portion GR of the view angle $\theta 1$ has the same degree angle as the left edge portion GL of the view angle $\theta 2$, the correction parameter generating unit 67 determines the angle of the right edge portion GR of the view angle $\theta 1$, and basing thereon, determines the correction parameter.

Figure 13A:
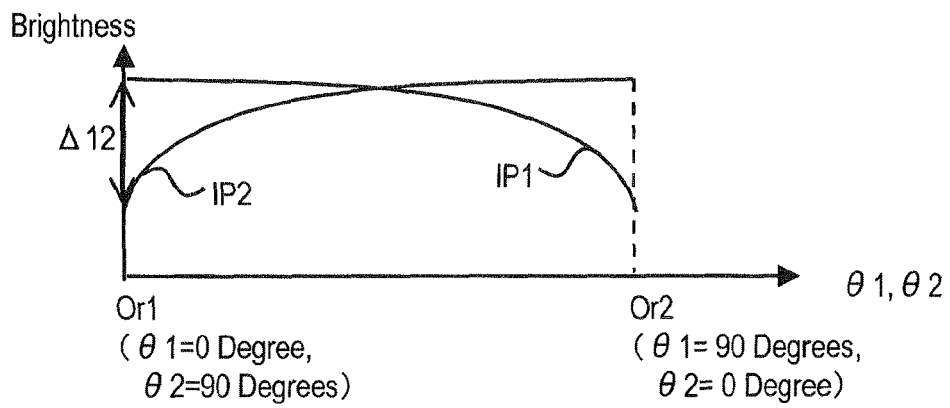
FIGS. 13A-13C depict theoretical brightness of the imaged image data.
Figure 13B:
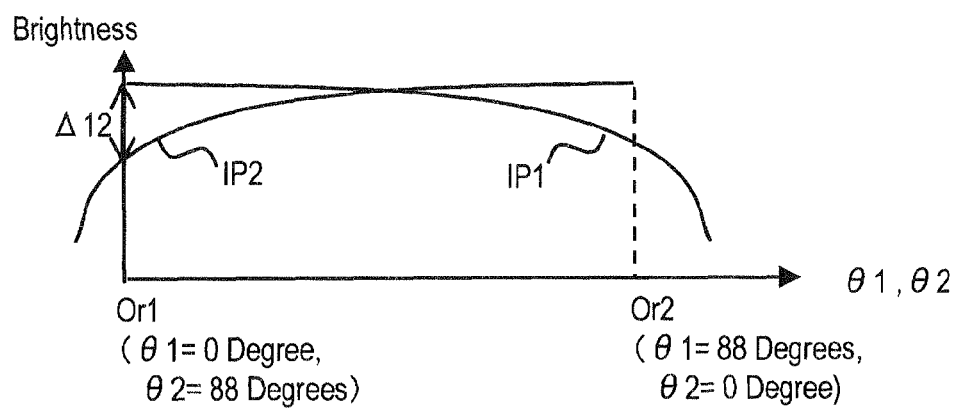
Figure 13C:
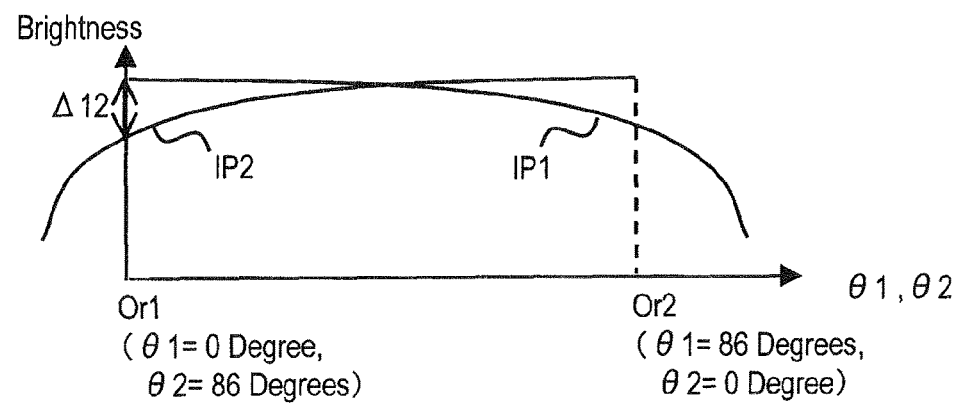

FIGS. 13A through 13C are diagrams depicting theoretical brightness of the imaged image data F1 and F2 for each view angle. In FIG. 13A, each view angle $\theta 1$ and $\theta 2$ of the imaged image data F1 and F2 is depicted in the horizontal axis, and theoretical brightness IP1, IP2 for each view angle is depicted in the vertical axis. Here, there is depicted a case that the right edge portion GR of the view angle $\theta 1$ has a "90" degree angle, and the left edge portion GL of the view angle $\theta 2$ also has a "90" degree angle. Further, "0" degree of the center Or1 of the view angle $\theta 1$ is depicted at the left edge of the horizontal axis, and "90" degree of the right edge portion GR is depicted at the right edge of the horizontal axis. In contrast and opposite thereto, "0" degree of the center Or2 of the view angle $\theta 2$ is depicted at the right edge of the horizontal axis, and "90" degree of the left edge portion GL is depicted at the left edge of the horizontal axis.

Here, the theoretical brightness IP1 at the center Or1 ("0" degree) of the view angle $\theta 1$ is determined to be $\cos\,\hat{}\,4(0)$ (=1). Let the above brightness be reference brightness "100", then the theoretical brightness IP2 at the left edge portion GL ("90" degrees) of the view angle $\theta 2$ is determined to be $100 \times \cos\,\hat{}\,4(90)$ (=1.41E−63). Therefore, a brightness difference $\Delta 12$ (=IP1−IP2) at this time becomes $100 \times \{\cos\,\hat{}\,4(0) - \cos\,\hat{}\,4(90)\}$.

Next, in FIG. 13B, a case that the right edge portion GR (the left edge portion GL) of the view angle θ1 (θ2) has an "88" degree angle is depicted. Here, the brightness IP2 at the left edge portion GL ("88" degrees) of the view angle θ2 is determined to be 100×cos ^4(88) (=0.000148). Therefore, the brightness difference Δ12 at this time becomes 100×{cos ^4(0)−cos ^4(88)}.

Next, in FIG. 13C, a case that the right edge portion GR (left edge portion GL) of the view angle θ1 (θ2) has an "86" degree angle is depicted. Here, the brightness IP2 at the left edge portion GL ("88" degrees) of the view angle θ2 is determined to be 100×cos ^4(86) (=0.002368). Therefore, the brightness difference Δ12 at this time becomes 100×{cos ^4(0)−cos ^4(86)}.

As such, in the state that the center Or1, "0" degree angle, of the view angle θ1 is fixed, the difference of brightness when the left edge portion GL of the view angle θ2 is changed is theoretically determined.

FIGS. 14A-14C are diagrams depicting the theoretical difference values of the brightness of the imaged image data F1 and F2 determined from the cosine fourth law. In FIG. 14A, the brightness IP1 at the view angle θ1 is depicted. Here, the brightness IP1 is cos ^4(θ1)=1 when the view angle θ1 is "0" degree (that is, the center Or1), in which theoretical brightness IP1 is defined to be "100". Then, as the view angle θ1 is varied with values of "2" "4" . . . , "86" "88" and "90" degrees, the theoretical brightness IP1 is varied with values of "99.75655", "99.02917", . . . , "0.002368", "0.000148" and "1.41E−63", in accordance with cos ^4(θ1).

In FIG. 14B, the brightness IP2 at the view angle θ2 is depicted. Here, as the view angle θ2 is varied with values of "90", "88", "86", . . . , "4", "2" and "0" degrees, the theoretical brightness IP2 is varied with values of "1.41E−63", "0.000148", "0.002368", . . . , "99.02917", "99.75655" and "100" according to cos ^4(θ1), in a reverse order of FIG. 14A.

Further, in FIG. 14C, theoretical difference values ΔIP= (IP1−IP2)/(IP1+IP2) determined from the theoretical brightness IP1 and IP2 are depicted. Here, there are depicted the theoretical difference values ΔIP when θ2 is varied with values of "90", "88", "86", . . . , "4", "2" and "0" degrees in the state of the theoretical brightness IP1 fixed to "1" (θ1="0" degree). The relationship of correspondence between the view angles θ2 and the theoretical difference values MP depicted in FIG. 14C is stored in advance into the correction parameter generating unit 67, as the difference value table TBL3.

From the brightness of the imaged image data F1 at the center Or1 and the brightness of the imaged image data F2 at the left edge portion GL, the correction parameter generating unit 67 determines a difference value, and then determines the view angle θ2 corresponding to the difference value by referring to the above-mentioned difference value table TBL3. By this, the view angle of the imaged image data F2 at the left edge portion GL is determined. Therefore, the view angle of the imaged image data F1 opposite thereto at the right edge portion GR is obtained. Then, pixel-by-pixel view angles are determined from the number of pixels located from the center Or1 of the imaged image data F1 to the right edge portion GR, and accordingly, the brightness of each pixel is determined by using the cosine fourth law. Thus, a correction amount for the determined brightness is determined.

FIGS. 15A-15D and 16A-16C are diagrams depicting the second processing example by use of an example of the brightness of the imaged image data F1 and F2. In FIG. 15A, original brightness of the imaged image data F1 and F2 in the overlap area is depicted. Here, each square unit corresponds to each pixel, and the numeric value included therein indicates the brightness of each pixel. FIG. 15B depicts the brightness P1 of the imaged image data F1 that includes shading. The pixel at the center Or1 has original brightness "255", and however, the pixel brightness gradually attenuates from the center Or1 in a concentric circle shape. On the other hand, FIG. 15C depicts the brightness P2 of the imaged image data F2 that includes shading. The pixel at the center Ort has original brightness "255", and however, the pixel brightness gradually attenuates from the center Ort in a concentric circle shape.

Next, FIG. 15D depicts difference values ΔP=(P1−P2)/ (P1+P2) determined by the difference value computing unit 66 from the brightness P1, P2 depicted in FIGS. 15B and 15C. Here, at the center Or1 of the imaged image data F1, a difference value ΔP is "0.179". Therefore, next, the correction parameter generating unit 67 determines a view angle θ2 corresponding to the difference value ΔP="0.179", from the difference value table TBL3.

FIG. 16A depicts an identical table to the difference value table TBL3 depicted in FIG. 14C. Here, a theoretical difference value ΔIP corresponding to the difference value ΔP="0.179" determined by the difference value computing unit 66 is "0.178998" (depicted by the arrow D1). Therefore, a view angle θ2 corresponding thereto is "24" degrees.

Next, the correction parameter generating unit 67 determines the view angle of each pixel in the imaged image data F1. In FIG. 16B, there is depicted the view angle θ1 determined corresponding to each pixel when letting the center Or1 of the imaged image data F1 have a "0" degree angle and the right edge portion GR have a "24" degree angle. Here, for example, since the number of pixels in the horizontal axis direction is 7, it is possible to determine the view angle on the basis of each distance corresponding to one pixel, by equally dividing the angle range from "0" degree to "24" degrees by the number of pixels. Therefore, for each pixel in the horizontal and vertical axis directions, it is possible to determine each view angle according to the distance (the number of pixels) from the center. In regard to oblique directions, each view angle for each pixel is determined from the distances in the horizontal and vertical axis directions, by use of the Pythagorean theorem, for example.

Then, the correction parameter generating unit 67 determines the proportion of brightness for each pixel by the cosine fourth law. FIG. 16C depicts the proportion of brightness corresponding to the view angle for each pixel depicted in FIG. 16B. Here, as contrasted to "1" at the center Or1, the proportion of brightness of the peripheral pixels gradually attenuates in a concentric circle shape. The correction parameter is determined based on the proportion of brightness thus determined. For example, by use of the proportion of brightness depicted in FIG. 16C as correction parameter, it is possible to determine the original brightness value depicted in FIG. 14A by dividing the brightness of each pixel by the above correction parameter. Alternatively, it may also be possible to determine the correction parameter using the reciprocal of the proportion of brightness depicted in FIG. 16C, as a multiplier coefficient. Also, by determining a correction amount for the brightness from the proportion of brightness, it may be possible to use the correction amount as correction parameter.

By the storage of such the correction parameter into the brightness correction table TBL1, the brightness correction table TBL1 is updated.

Further, in the entire imaged image data F1, the brightness attenuates from the center Or1 in a concentric circle shape. Therefore, in regard to pixels outside the overlap area also, it is possible to correct the brightness by applying the correction parameter according to the distance from the center Or1, depicted in FIG. 16C, to the pixels of the entire directions. By performing processing depicted in FIGS. 16A-16C in regard to the center Or2, it is possible to determine the brightness correction parameter for the imaged image data F2, and to update the brightness correction table TBL2.

Figure 17:
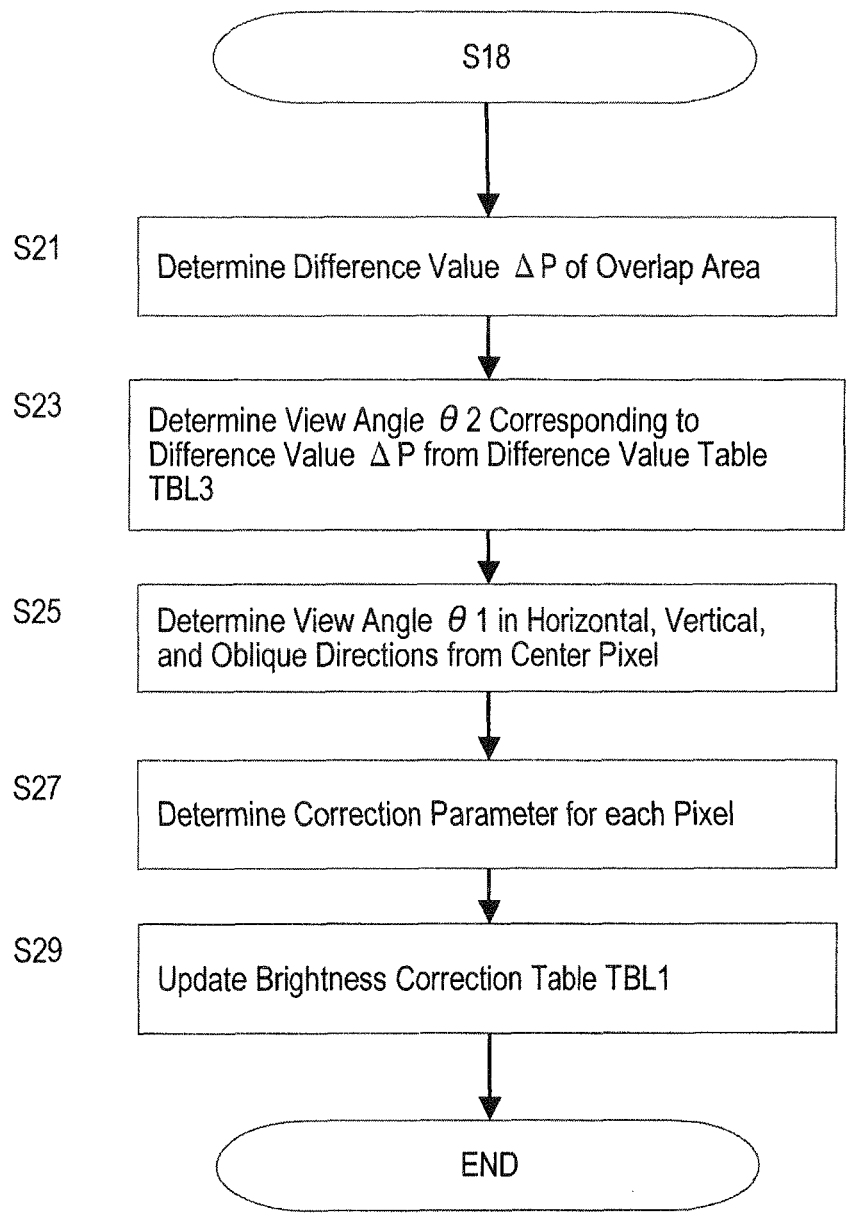
FIG. 17 depicts the procedure of the second processing example.

FIG. 17 is a flowchart depicting the procedure of the second processing example. The procedure depicted in FIG. 17 is executed in place of processes S20-S28 depicted in FIG. 11.

The difference value computing unit 66 determines difference values ΔP of the imaged image data F1 and F2 on a pixel-by-pixel basis (S21). Then, from the difference value table TBL3, the correction parameter generating unit 67 determines each view angle θ2 corresponding to each difference value ΔP (S23). The correction parameter generating unit 67 then determines the view angle θ1 for the pixels in the horizontal and vertical axis directions and oblique directions from the center pixel (S25). Then, the correction parameter generating unit 67 determines the correction parameter for each pixel (S27). The correction parameter generating unit 67 stores the correction parameter into the brightness correction table TBL1, and thus, the brightness correction table TBL1 is updated (S29). In addition, by the execution of the above-mentioned processes S21-S27 for the imaged image data F2, the brightness correction table TBL2 is updated in process S29.

Through such the procedure, it becomes possible to update the brightness correction tables TBL1 and TBL2 even after the shipment of the imaging apparatus 1. Also, even when an imaged image having uneven brightness is used, it is possible to determine a lens view angle by use of a theoretical difference value, and accordingly, it is possible to determine a highly accurate correction parameter near the theoretical value, for the lens view angle.

As described above, according to present embodiment, it is possible to update the brightness correction tables TBL1 and TBL2 by determining the correction parameters suitable for the lens even when the lens is exchanged after the imaging apparatus is started to be used. Accordingly, the brightness correction tables TBL1 and TBL2 are updated (generated) even when the brightness correction tables TBL1 and TBL2 stored in the manufacturing process are rewritten or erased, or when the process for storing the brightness correction table TBL1 is omitted in the manufacturing process. Thus, appropriate shading correction is achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

What is claimed is:

1. An image processing apparatus comprising:
a control unit being configured to have an imaging unit take a first image of an object image with a center position of view angle to the object image being a first position to obtain a first image data including a first brightness characteristic, and have the imaging unit take a second image of the object image with a center position of view angle to the object image being a second position different from the first position to obtain a second image data having a peripheral area at the center of the first image data and including a second brightness characteristic;
a computing unit being configured to determine a first difference value between brightness of the first image data and brightness of the second image data in an overlap area of the first image data and the second image data;
a generating unit being configured to generate, based on the first difference value, a second difference value relative to a brightness at the center of the first image data, and generate, based on the second difference value, a brightness correction parameter for the first image data; and
a correction unit being configured to correct the brightness of each pixel of the first image data according to the brightness correction parameter.

2. The image processing apparatus according to claim 1, wherein the generating unit is further configured to generate the brightness correction parameter for the first image data, by using an approximation equation corresponding to the second difference value.

3. An image processing apparatus comprising:
a control unit being configured to have an imaging unit take images of an object image having different center positions of view angles to the object image, and to obtain a first image data including a first brightness characteristic and a second image data having a peripheral area at the center of the first image data and including a second brightness characteristic;
a computing unit being configured to determine a first difference value between brightness of the first image data and brightness of the second image data in an overlap area of the first image data and the second image data;
a generating unit having a table including difference values between brightness of a first view angle at the center of the first image data and brightness of a second view angle, and being configured to determine, based on the table, the second view angle corresponding to the difference value determined by the computing unit, and determine a brightness correction parameter for the first image data based on the first view angle and the determined second view angle, by using the cosine fourth law; and
a correction unit being configured to correct the brightness of each pixel of the first image data according to the brightness correction parameter.

4. The image processing apparatus according to claim 1, wherein the correction parameter is a multiplier coefficient for the brightness of the first image data.

5. The image processing apparatus according to claim 3, wherein the correction parameter is a multiplier coefficient for the brightness of the first image data.

6. The image processing apparatus according to claim 1, wherein, in the first image data, a brightness attenuation factor increases from the center to the peripheral area in a concentric fashion, and
the image processing apparatus further comprising:
a correction parameter table including a brightness correction parameter for each pixel for the first image data in correspondence with a distance from the center; and
wherein the correcting unit is further configured to correct the brightness of each pixel in the first image data by using the correction parameter according to the distance from the center.

7. The image processing apparatus according to claim 3, wherein, in the first image data, a brightness attenuation factor increases from the center to the peripheral area in a concentric fashion, and the image processing apparatus further comprising:

a correction parameter table including a brightness correction parameter for each pixel for the first image data in correspondence with a distance from the center; and wherein the correcting unit is further configured to correct the brightness of each pixel in the first image data by using the correction parameter according to the distance from the center.

8. The image processing apparatus according to claim 1, wherein the control unit is further configured to allow first and second imaging units to perform imaging by varying imaging directions of both or either one of the first and second imaging units, and obtain the first and second image data.

9. The image processing apparatus according to claim 3, wherein the control unit is further configured to allow first and second imaging units to perform imaging by varying imaging directions of both or either one of the first and second imaging units, and obtain the first and second image data.

10. The image processing apparatus according to claim 1, wherein the control unit is further configured to obtain the first image data by allowing the imaging unit to perform imaging, and obtain the second image data by allowing the imaging unit to vary an imaging direction.

11. The image processing apparatus according to claim 3, wherein the control unit is further configured to obtain the first image data by allowing the imaging unit to perform imaging, and obtain the second image data by allowing the imaging unit to vary an imaging direction.

12. An imaging apparatus comprising the image processing apparatus, the first and second imaging units, and the control unit as described in claim 8.

13. An imaging apparatus comprising the image processing apparatus, the first and second imaging units, and the control unit as described in claim 9.

14. An imaging apparatus comprising the image processing apparatus, the imaging unit, and the control unit as described in claim 10.

15. An imaging apparatus comprising the image processing apparatus, the imaging unit, and the control unit as described in claim 11.

16. An image processing method comprising:

having an imaging unit take a first image of an object image with a center position of view angle to the object image being a first position to obtain a first image data including a first brightness characteristic;

having the imaging unit take a second image of the object image with a center position of view angle to the object image being a second position different from the first position to obtain a second image data having a peripheral area at the center of the first image data and including a second brightness characteristic;

determining a first difference value between brightness of the first image data and brightness of the second image data in an overlap area of the first image data and the second image data;

generating a brightness correction parameter for the first image data corresponding to the determined difference value, by generating a second difference value relative to brightness at the center of the first image data based on the first difference value, and by generating the brightness correction parameter for the first image data based on the second difference value; and correcting the brightness of each pixel of the first image data according to the brightness correction parameter.

17. An image processing method comprising:

having an imaging unit take images of a object image with different center positions of view angle to the object image, and obtaining a first image data including a first brightness characteristic and a second image data having a peripheral area at the center of the first image data and including a second brightness characteristic;

determining a first difference value between brightness of the first image data and brightness of the second image data in an overlap area of the first image data and the second image data;

generating a brightness correction parameter for the first image data, by determining the second view angle corresponding to the first difference value based on a table including difference values between brightness of a first view angle at the center of the first image data and brightness of a second view angle, and by determining the brightness correction parameter for the first image data based on the first view angle and the determined second view angle by use of the cosine fourth law; and correcting the brightness of each pixel of the first image data according to the brightness correction parameter.

* * * * *